(No Model.)  2 Sheets—Sheet 1.

W. O. YARBOROUGH.
CORN PLANTER.

No. 367,491.  Patented Aug. 2, 1887.

WITNESSES
F. L. Durand
Julius Solger

INVENTOR
W. O. Yarborough
Frank A. Fouts  Attorney

N. PETERS, Photo-Lithographer, Washington, D. C.

(No Model.) 2 Sheets—Sheet 2.

W. O. YARBOROUGH.
CORN PLANTER.

No. 367,491. Patented Aug. 2, 1887.

WITNESSES
F. L. Ourand
Julius Solger

INVENTOR
W. O. Yarborough
Frank A. Fouts Attorney

UNITED STATES PATENT OFFICE.

WILLIAM O. YARBOROUGH, OF ODEN, TEXAS.

CORN-PLANTER.

SPECIFICATION forming part of Letters Patent No. 367,491, dated August 2, 1887.

Application filed September 27, 1886. Serial No. 214,683. (No model.)

*To all whom it may concern:*

Be it known that I, WILLIAM O. YARBOROUGH, a citizen of the United States, residing at Oden, in the county of Leon and State of Texas, have invented certain new and useful Improvements in Corn-Planters; and I do hereby declare the following to be a full, clear, and exact description of the invention, such as will enable others skilled in the art to which it appertains to make and use the same.

This invention relates to improvements in planters, its main object being to construct a machine which, by means of certain detachable parts hereinafter described, may be arranged to be used either as a cotton or a corn planter.

A further object of this invention is to provide devices adapted to be attached to the rear of the machine, whereby the soil in rear of the covering blades or shovels may be either harrowed or graded and smooth.

The device herein shown is a combined cotton and corn planter. The claims of this application, however, will be limited to the corn-planter features. A second application is contemplated, which will embrace the cotton-planter features.

The invention consists in the construction and novel arrangement of various parts hereinafter described, illustrated in the accompanying drawings, and pointed out in the claims hereto appended.

Figure 7:
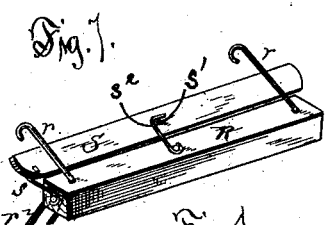
Figure 1:
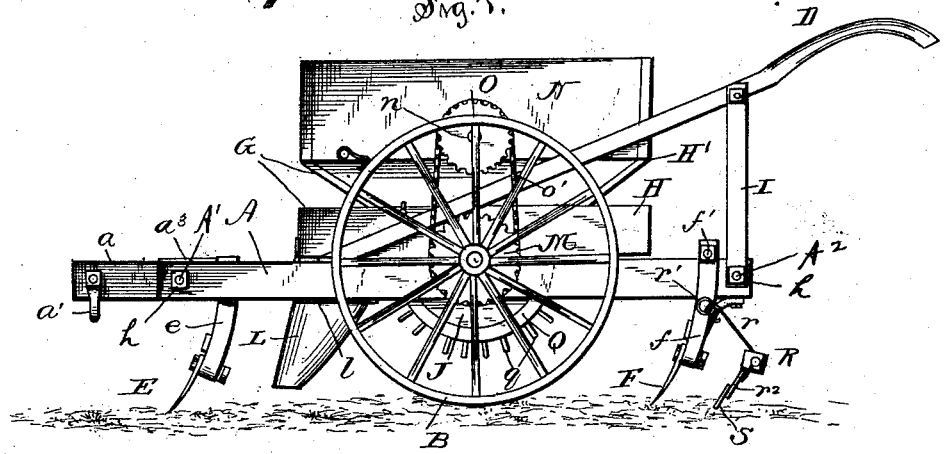
Figure 2:
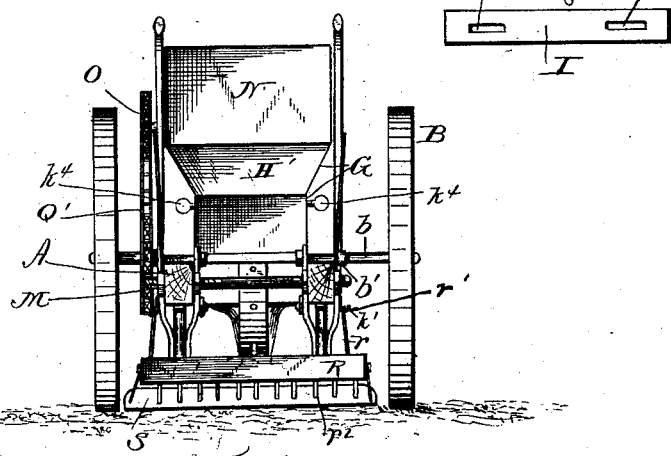
Figure 8:
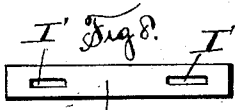
Figure 6:
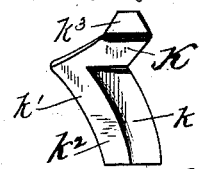
Figure 3:
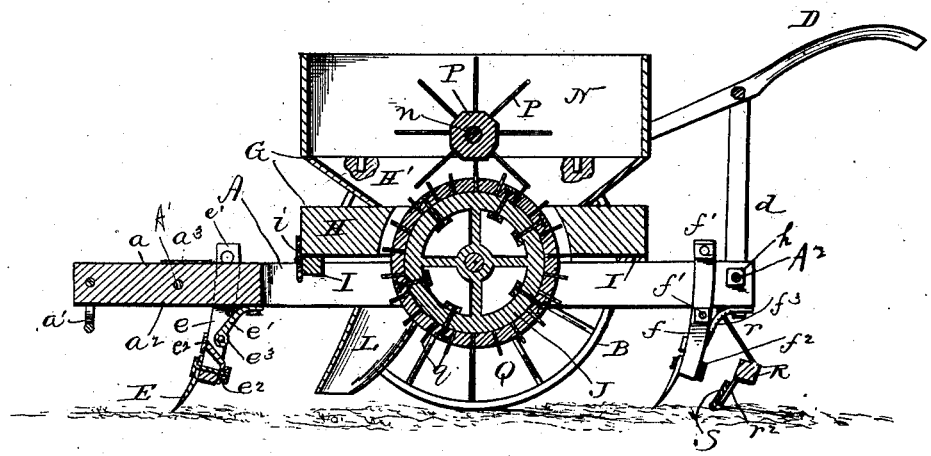
Figure 4:
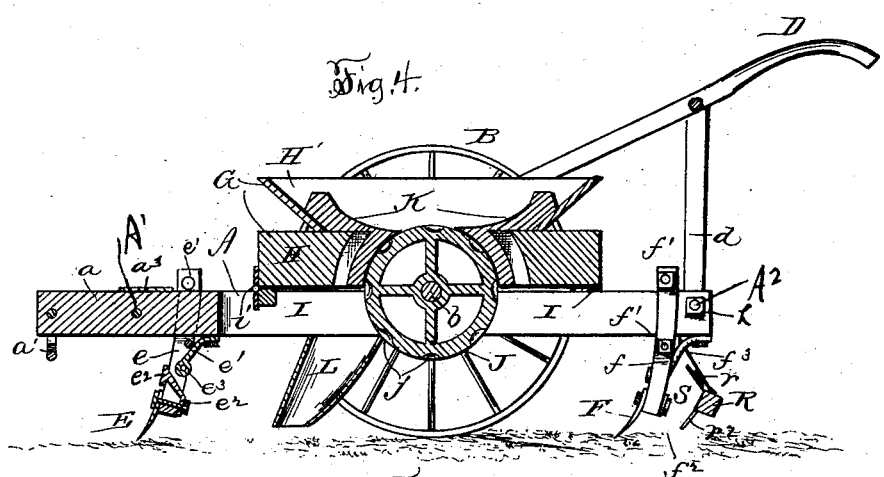
Figure 5:
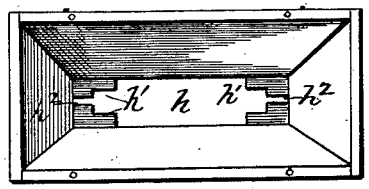

Figure 1 represents a side elevation of the machine. Fig. 2 represents a rear elevation of the same. Fig. 3 is a central vertical longitudinal section of the machine when arranged to plant cotton. Fig. 4 is a similar view of the same when arranged to plant corn. Fig. 5 is a plan view of the seed-box, showing the opening in the bed-block thereof. Fig. 6 is a detail view of one of the detachable blocks, and Fig. 7 is a detail view of the harrowing and grading device. Fig. 8 is a plan view of one of the slotted cross-plates which serve to unite the frame-pieces.

The letters A A represent two parallel bars constituting the main frame of the machine. The ends of these bars are provided with transverse openings for the reception of the front and rear cross-bolts, A' A², respectively. The ends of these bolts are threaded and provided with nuts $h$ on both sides of each frame-piece.

The letter $a^3$ represents a strap across the top of the front ends of the frame-pieces. This strap is secured by bolts or other suitable means. The frame-pieces are also secured by slotted cross-bars, which will be hereinafter described.

The letter $a$ represents a short draw-bar. This bar is provided with an outer end clevis, $a'$. The forward frame-bolt, A', passes through this bar. Said bar is interposed between the front frame-pieces, A A. There is a space between the outer sides of the bar and the inner faces of the frame-pieces. Nuts are secured to the cross-bolts in these spaces for the purpose of laterally adjusting the frame and rear plows, and for the purpose of holding the parts in a fixed relative position. The cross-plate A³ is bolted to the bar $a$.

B B are the wheels, keyed or otherwise secured on the ends of the main shaft or axle $b$, which turns in bearings secured to the upper surfaces of the side bars of the main frame somewhat to the rear of the center thereof.

$b'$ $b'$ are collars secured on the shaft $b$ by set-screws outside of the bearings to keep the shaft from lateral motion.

D D are the handles, having their front ends secured to the side bars of the main frame, and $d$ $d$ are brace-straps, with their upper ends bolted to the sides of the handles and their lower ends secured to the frame-pieces A.

E is the furrow-opening blade or plow point, secured to the lower end of the standard $e$, which is composed of a metallic bar bent upon itself, so as to form two arms, and extended rearward and upward to the rear sides of the draw-bar $a$, to which said arms are secured by bolts and nuts $e'$ $e'$ above and below the draw-bar. These bolts firmly clamp the standard-arms to said draw-bar.

$e^2$ is a metallic block, which rests between the standard-arms. The upper part of the block $e^2$, above the furrow-opener, is flanged out on both sides, the flanges resting on the upper edges of the arms of the standard $e$ and giving the block additional support.

$e^3$ is a brace-bar, the upper end of which is bolted to the under side of the draw-bar, the lower end bearing against the block $e^2$, so that the latter is stayed thereby, and its flanged upper end forms a support for the upper edge of the furrow-opener.

F F are covering-shovels similar to the furrow-opening shovel. The standard-arms of these shovels are bolted to the rear of the frame-pieces A. The rear shovel-arms and the immediately-connected parts are constructed like the front shovel and arms. They are also attached in a like manner, the corresponding parts of each being the shaft $f$, the securing-bolts $f'$ $f'$, the block $f^2$, and the brace-bar $f^3$.

G is the hopper, composed of the rectangular bed-block H and the grain-receiver or feed-box H', the ends and sides of which converge from above downward. The bed-block has its lower surface plated with metal, preferably wrought-iron, and a long central opening, $h$, passes through both block and lining metal longitudinally and communicates with the feed-box H'. The said opening has at each end the shoulders $h'$ $h'$, one on each side, and between, in the axis of the block H, the long notch or slit $h^2$. The purpose of this construction of the opening is hereinafter explained.

The front end of the block H is hinged centrally at $i$ to the front one of two slotted bars, I I, which cross the top of the main frame near its front and rear ends respectively, and on which the said block rests. The ends of the bars are provided with longitudinal slots I' for the reception of bolts, which bolts are secured in the upper sides of the frame-pieces A. By means of these slotted bars and bolts, and the cross-bolts which unite the frame, the rear ends of the frame-pieces, which carry the rear plows, may be laterally adjusted.

J is a wheel secured centrally upon the shaft or axle $b$ and passing up through the opening $h$, the parts being so arranged and at such distances apart that the entering portion of the periphery of the wheel fits snugly into and closes that portion of the opening lying between the shoulders of the opposite ends of the opening, leaving the parts between the shoulders of each end and the slit $h^2$ open. The ends of the shoulders $h'$ curve downward and outward in the arc of a circle very slightly larger than the periphery of the wheel J, and concentric therewith, so that the latter can turn closely against the shoulders. The ends of the opening and of the slits $h^2$ are also curved on the arcs of circles concentric with the periphery, for purposes hereinafter explained.

The periphery of the wheel J is provided with the equal-sized and equidistant pockets or recesses $j$ $j$, to hold charges of corn when planting the same.

When the machine is used as a corn-planter, the blocks K are inserted in the ends of the opening $h$. These blocks have each a flange, $k$, on its outer edge, a body portion, $k'$, which form equal shoulders with said flange on each side thereof, and which has a bearing-surface, $k^2$, and a proper handle, $k^3$, to insert and remove the plug. The flange is properly curved to fit snugly in the slit $h^2$ at the end, and the bearing-surface stands flush with the edges of the shoulders $h'$, being made on the same arc therewith, while the upper end of the body $k'$ closes the space between said shoulders, so that the opening $h$ extends only to the same, substantially. The blocks K are held in place by screws or other suitable means.

In planting corn, when the machine moves forward and the main shaft $b$ and wheel J, secured thereto, turn, the corn in the feed-box H' cannot escape therefrom except by means of the pockets $j$, as the wheel turns downward against the bearing-surface of the front block, K, and as these pockets are equidistant and of equal size, the corn will escape in equal charges, equally distant apart. The corn in leaving the slot $h$ falls into the planting or delivery tube L, which inclines downward and forward, with its discharge-opening immediately above the furrow made by the furrow-opener. The upper end of the tube L is secured to the machine by its lateral wings $l$ $l$ being bolted to the lower surfaces of the side bars of the main frame.

When using the machine to plant cotton, the blocks K are removed, and the hereinafter-described mechanism comes into play.

M is a chain-wheel permanently secured to the axle $b$ on one side. To the outer side of main frame N is a seed-box secured to the top of the grain-receptacle or feed-box H', by means of dowel-pins on its lower edge entering proper recesses in the meeting edge of the latter, or by other suitable means that render the seed-box detachable. When in place, it is retained so by swinging hooks pivoted to its sides, engaging pins standing from the sides of the feed-box H'.

$n$ is a transverse shaft journaled in metal boxes secured in the sides of the box N, near its lower edge. The shaft $n$ is about vertically above the main shaft $b$, and has secured upon it a chain-wheel, O, above the wheel M, a chain, $o'$, engaging the two wheels.

P is a shaft secured to and turning with the shaft $n$ within the seed-box, which shaft P serves as a head-block for the radiating series of agitator-arms $p$, secured in rows or sets around its periphery.

Q is a peripheral band or ring made in sections and detachably secured upon the edge of the wheel J by bolts or otherwise. The said band is narrower than the wheel and stands out therefrom, being of proper width and thickness to enter the spaces between the shoulders $h'$ at each end of the opening $h$ and close the same, while turning against the ends of the opening.

$q$ $q$ are a series of radial, equal-sized, and equidistant pins or fingers which stand out from the central line of the periphery of the band Q, and successively enter and pass through the front slit, $h^2$, when the wheel J is turned by the forward motion of the machine.

It is evident from the foregoing that when the fingers are actuated, as described, they will force the cotton-seed descending from the seed-box N down through the forward slit, $h^2$, and thence cause them to fall into the tube L, whence they descend into the furrow. At the same time the revolution of the agitator-arms $p$, caused by the action of the chain and chain-wheels, will stir up and loosen the seed and carry them over to a point above the fingers.

The grading and harrowing devices are as follows: R is a head-bar having secured to its upper surface near its ends the outer ends of the rods $r$, the inner ends of which are looped and engaged over the hooks $r'$, secured to the standards of the covering-shovels. Said bar is provided with a series of depending harrow-teeth, $r^2$.

S is a grading and smoothing board, having secured to its ends, near its upper edge, the lower ends of the rods $s$, the upper ends of which are looped and engaged upon pins in the ends of the head-bar in such manner that the said board will swing against the front surface of the harrow-teeth with its free edge slightly lower than the ends thereof, so that as the machine moves forward the said edge will grade and smooth the soil in rear of the covering-shovels. When it is desired to use the harrow-teeth, the board S is raised up and a pin, $s'$, on its upper or front surface is engaged by a hook, $s^2$, pivoted on the upper edge of the head-bar. The grading-board is thus retained up and the harrow-teeth come into operation in rear of the covering-shovels.

Having thus described my invention, I claim as new and desire to secure by Letters Patent—

1. The combination of the hopper composed of the feed-box or grain-receptacle and the bed-block hinged to the main frame, the said block being provided with the opening shoulders and splits, substantially as described, the detachable blocks closing when in place the said slits and spaces between said shoulders at each end of the opening, and the grain-discharging wheel provided with the equidistant equal-sized pockets, and turning with the main shaft of the machine, substantially as specified.

2. The combination of the hopper composed of the grain-receptacle and the bed-block hinged to the main frame, said bed-block being provided with the opening shoulders and splits, substantially as described, the detachable blocks closing when in place the said slits, and spaces between said shoulders at each end of the opening, the grain-discharge wheel provided with the equidistant equal-sized pockets and turning with the main shaft of the machine, and the discharge or planting-tube secured to the main frame in proper position to conduct the grain from the opening to a point above the furrow in rear of the furrow-opener, substantially as specified.

3. The combination of the furrow-opener secured to the front of the main frame, the closing-shovels secured to the rear of said frame, and the grading and harrowing devices, substantially as described, attached to the rear of the main frame, with the hopper composed of the feed-box and hinged bed-block, said block provided with the opening shoulders and splits, substantially as described, the detachable blocks, the feeding-wheel provided with pockets and turning with the main shaft, and the planting-tube secured to the main frame and conducting the falling grain to the furrow in rear of the furrow-opener, substantially as specified.

4. The combination, with the main frame, the main shaft journaled thereon, the wheels secured to the ends of the main shaft, the furrow-opener, and closing-shovels, and the grading and harrowing device, constructed substantially as described, of the hopper G, composed of the grain-receptacle H' and bed-block H, the transverse slats I, upon which the bed-block rests and to the front one of which it is hinged, the opening $h$ in the bed-block, the shoulders $h'$ and slits $h^2$, the detachable blocks K, provided with the flange $k$, the body portion $k'$, bearing-surface $k^2$, and handle $k^4$, the wheel J, secured to the main shaft and provided with the pockets $j$, and the planting-tube L, secured by its lateral wings $l\ l$ to the side bars of the main frame, substantially as specified.

5. In combination, the corn and cotton planter, constructed substantially as described, the harrowing, grading, and smoothing device composed of the head-bar hung to the rear of the machine and provided with the harrow-teeth, the grading-board hung to the said head-bar in position to rest against the harrow-teeth, and means, substantially as described, for keeping the said grading-board raised.

6. In combination, the corn and cotton planter, constructed substantially as described, the hooks $r'$, secured to its rear end, the head-bar R, provided with the harrow-teeth $r^2$, the rods $r$, whereby the said head-bar is hung to the hooks $r'$, the grading-board S, provided with the pin $s'$, the hook $s^2$, engaging therewith, and the rods $s$, by which the grading-board is hung to the ends of the head-bar, substantially as specified.

In testimony whereof I affix my signature in presence of two witnesses.

WILLIAM O. YARBOROUGH.

Witnesses:
G. F. SHEPARD,
W. R. LOONEY.